(12) United States Patent
Auflick et al.

(10) Patent No.: US 6,700,839 B1
(45) Date of Patent: Mar. 2, 2004

(54) FAST SEEK BETWEEN MULTIPLE SELECTIONS IN A MULTIMEDIA PLAYER

(75) Inventors: Jack L. Auflick, Westland, MI (US); David S. Cheney, White Lake, MI (US); Dennis Allen, Southfield, MI (US); Angelo Giannotti, Riverview, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 209 days.

(21) Appl. No.: 10/078,715

(22) Filed: Feb. 19, 2002

(51) Int. Cl.[7] ................................................ G11B 21/08
(52) U.S. Cl. ..................................................... 369/30.08
(58) Field of Search ........................... 369/30.08, 30.09, 369/30.1, 30.11, 30.12; 386/55, 69

(56) References Cited

U.S. PATENT DOCUMENTS

| | | | |
|---|---|---|---|
| 4,460,958 A | | 7/1984 | Christopher et al. |
| 5,051,973 A | * | 9/1991 | Shiba et al. ............. 369/30.06 |
| 5,363,345 A | * | 11/1994 | Boucher et al. ............ 367/162 |
| 5,457,669 A | | 10/1995 | Kim et al. |
| 5,570,340 A | | 10/1996 | Lee et al. |
| 5,594,601 A | * | 1/1997 | Mimick et al. ............ 360/72.2 |
| 5,594,709 A | * | 1/1997 | Nagano et al. .......... 369/30.23 |
| 5,668,788 A | * | 9/1997 | Allison ....................... 345/173 |
| 5,790,443 A | | 8/1998 | Shen et al. |
| 5,890,910 A | | 4/1999 | Tsurumi et al. |
| 6,023,706 A | | 2/2000 | Schmuck et al. |
| 6,073,228 A | | 6/2000 | Holmqvist et al. |
| 6,091,674 A | * | 7/2000 | Tozaki et al. ............ 369/30.04 |
| 6,122,646 A | | 9/2000 | Igarashi et al. |
| 6,128,255 A | * | 10/2000 | Yankowski .............. 369/30.06 |
| 6,185,163 B1 | * | 2/2001 | Bickford et al. ............... 369/7 |
| 6,247,130 B1 | | 6/2001 | Fritsch |
| 6,248,946 B1 | | 6/2001 | Dwek |
| 6,388,958 B1 | * | 5/2002 | Yankowski .............. 369/30.06 |
| 6,446,080 B1 | * | 9/2002 | Van Ryzin et al. ...... 707/104.1 |
| 6,452,875 B1 | * | 9/2002 | Lee et al. ................ 369/30.04 |
| 6,542,445 B2 | * | 4/2003 | Ijichi et al. .............. 369/30.08 |

* cited by examiner

Primary Examiner—Tan Dinh
(74) Attorney, Agent, or Firm—MacMillian, Sobanski & Todd, LLC

(57) ABSTRACT

A multimedia player has a fast seek function for navigating between track selections contained within a large playlist. By holding down a seek-up or a seek-down button, a selection identifying display scrolls through the selections in a playlist in single steps until a multiple of 10 is reached. If a minimum number of single steps (e.g., 4) have been taken, then the display begins to jump by 10's. Otherwise, single steps are taken until the next multiple of 10. Single stepping is again used when the display nears the beginning or end of the playlist.

27 Claims, 6 Drawing Sheets

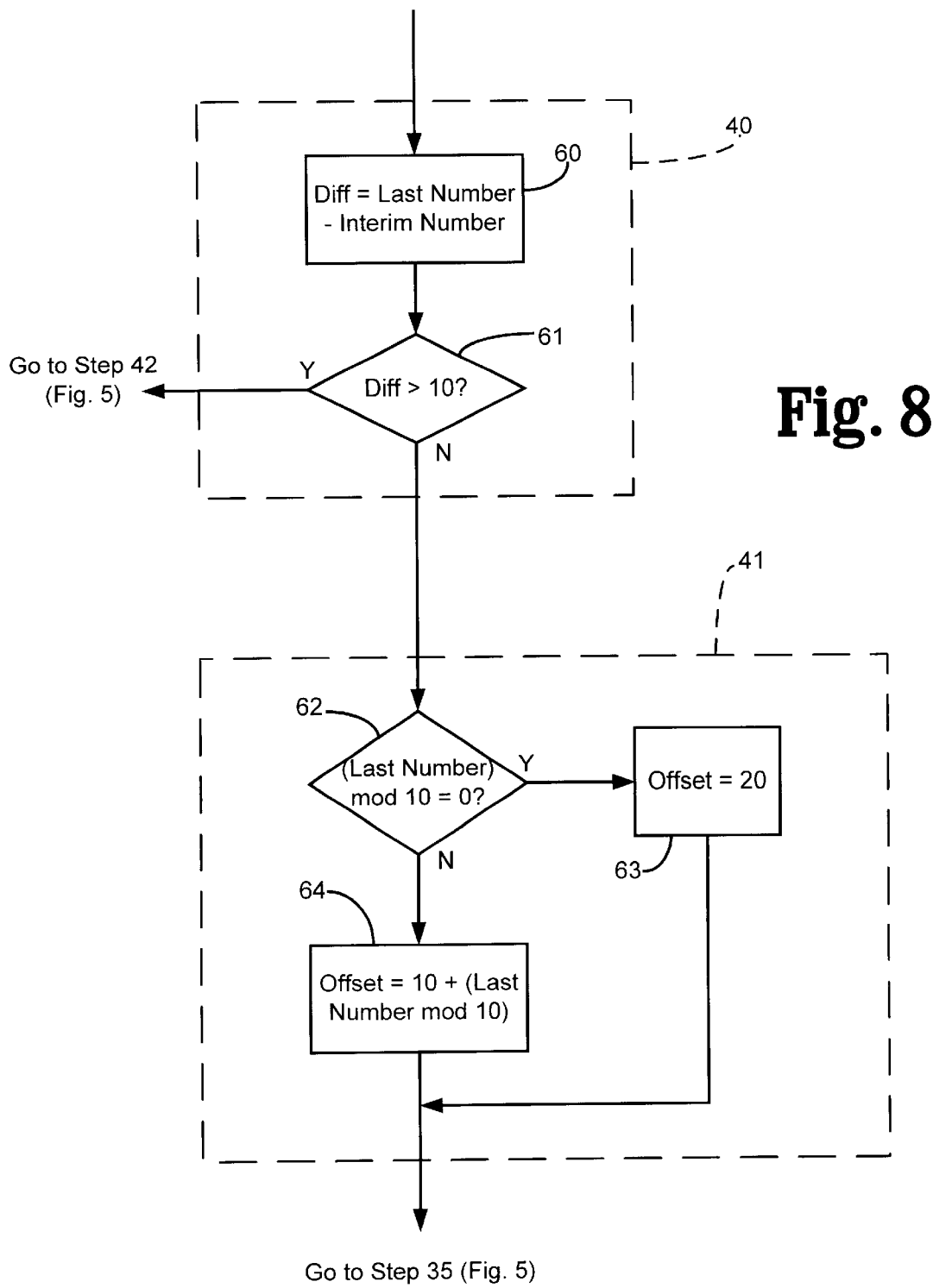

FAST SEEK BETWEEN MULTIPLE SELECTIONS IN A MULTIMEDIA PLAYER

CROSS REFERENCE TO RELATED APPLICATIONS

This application is related to co-pending U.S. application Ser. No. 10/078,615, filed Feb. 19, 2002, entitled "Rotary Control for Quick Playlist Navigation in a Vehicular Multimedia Player," and to co-pending U.S. application Ser. No. 10/076,230, filed Feb. 14, 2002, entitled "Track Access Management for Large Playlists in A Vehicular Multimedia Player."

STATEMENT REGARDING FEDERALLY SPONSORED RESEARCH

Not Applicable.

BACKGROUND OF THE INVENTION

The present invention relates in general to multimedia entertainment systems, and, more specifically, to a multimedia player having a fast seek function for navigating between track selections contained within a playlist.

With the emergence of techniques such as MP3 for compressing digital audio files, the number of track selections (e.g., songs) stored on a single medium (e.g., a compact disc, a hard disk drive, or a flash memory card) can become very large. For example, a compact disc (CD) with a capacity of 650 megabytes can store more than 10 hours of recorded music in many hundreds of separate MP3-encoded files. The MP3 format is formally called MPEG-1 layer 3, which was adopted by the Moving Picture Experts Group jointly operated by the International Standards Organization (ISO) and the International Electro-Technical Commission (IEC). A digital audio file with this encoding has a file extension of "mp3". Many users are compiling extensive libraries of MP3 material for playing from their computers and from dedicated media players.

Other compression technologies are also known, such as AAC, which allow many individual digital audio tracks to be stored in the same individual unit of media. Furthermore, storage capacity of various media types (such as hard disk drives) are increasing to the point where large numbers of uncompressed files can be stored and simultaneously accessible to a player.

Media players for such digital audio media must provide ways in which the user of the media player can navigate to (i.e., choose) a desired selection for reproduction. In mobile applications, such as a personal handheld unit or an automotive entertainment system, the number of user controls and/or display sizes may be limited. Due to the large number of selections that may be in a particular playlist (i.e., a grouping of audio selections active within a player), the user must be able to rapidly move within the playlist. However, ways have been lacking for fast, simple, and efficient navigation among selections using an uncomplicated interface (e.g., a small number of push buttons and a display having few character spaces).

SUMMARY OF THE INVENTION

The present invention has the advantage of providing a fast, simple, and efficient navigation method and apparatus for seeking to a desired selection within a large playlist.

In one aspect of the invention, a method is provided for fast seeking from a current selection to a desired selection within an ordered playlist of selections. Each selection in the ordered playlist has a corresponding selection number between a first selection number and a last selection number. Selection identifying data of the current selection is displayed on a display. A control action is performed indicating either a seek-up or a seek-down command. A control action is performed to establish a fast seek interval. During the fast seek interval, selection identifying data is displayed for interim selections on the display according to a predetermined sequence of the selection numbers wherein the interim selection is indexed to successive selections in the sequence in an increasing order in response to the seek-up command and is indexed to successive selections in the sequence in a decreasing order in response to the seek-down command. The sequence indexes the interim selection number in single steps until the interim selection number has a predetermined modulo value and then indexes the interim selection number by a jump step. Selection identifying data for each interim selection in the sequence is displayed for a predetermined display time. A control action is performed to terminate the fast seek interval, such that an interim selection having its selection identifying data being displayed at the termination of the fast seek interval is a chosen selection. The chosen selection is reproduced by the media player.

BRIEF DESCRIPTION OF THE DRAWINGS

FIG. 8 is a flowchart showing the re-initialization of the Offset Count when nearing the beginning or end of the playlist while in a seek-up mode.

DETAILED DESCRIPTION OF PREFERRED EMBODIMENTS

Figure 1:
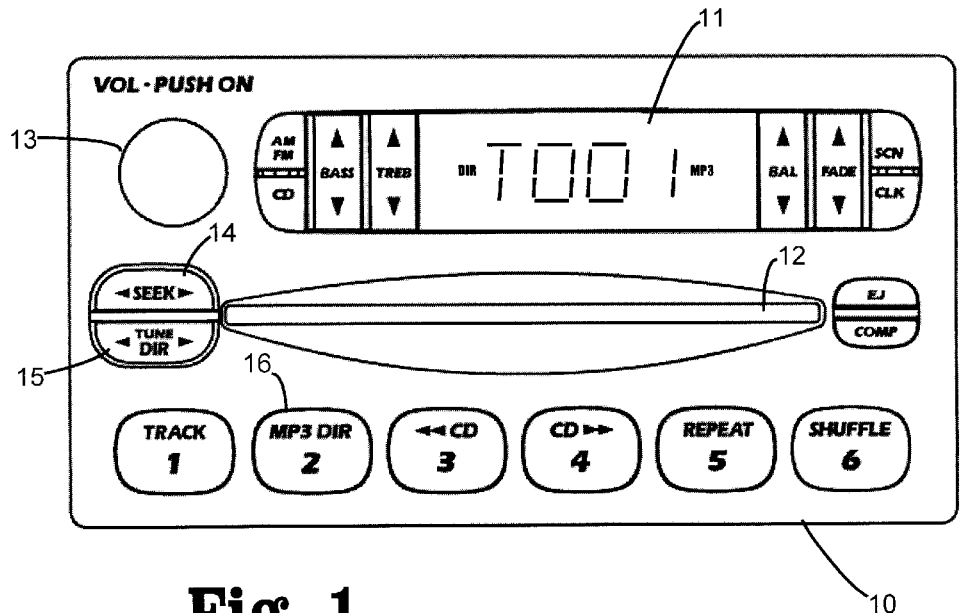
FIG. 1 is a front, plan view of a media player of the present invention.

Referring now to FIG. 1, a media player 10 may comprise a multimedia AM/FM/CD/CDDJ/MP3 player for installation in an automotive instrument panel, for example. A control panel of media player 10 includes a multi-character, segmented display 11 having character segments for displaying selection identifying data (e.g., track number, file name, etc.). Display 11 also contains special icons for illumination during specific conditions (e.g., to indicate that an MP3 media is being played, or that the player is in a directory mode, as explained later).

A slot 12 receives a CD-ROM compact disc having digital audio files (e.g., MP3 files) stored thereon. Preferably, slot 12 also accepts standard CD-Audio discs for reproduction of CD tracks. A remote disc jockey (CDDJ) may also be controlled by media player 10, and CD-ROM discs containing MP3 files may be loaded into and reproduced from the CDDJ located remotely from the control panel.

The control panel of media player 10 includes a combination rotary/push button knob 13 for turning the unit on and off and for adjusting the playing volume. The user control interface also includes other push buttons including a seek rocker switch 14, a tune rocker switch 15, and a preset/directory button 16. Seek rocker switch 14 produces a seek-down command when its left end is pressed and a seek-up command when its right end is pressed. Directory rocker switch 14 produces a previous-directory command when its left end is pressed and a next-directory command when its right end is pressed. Push button 16 toggles between a flat-file mode and a directory mode as described below.

Figure 2:
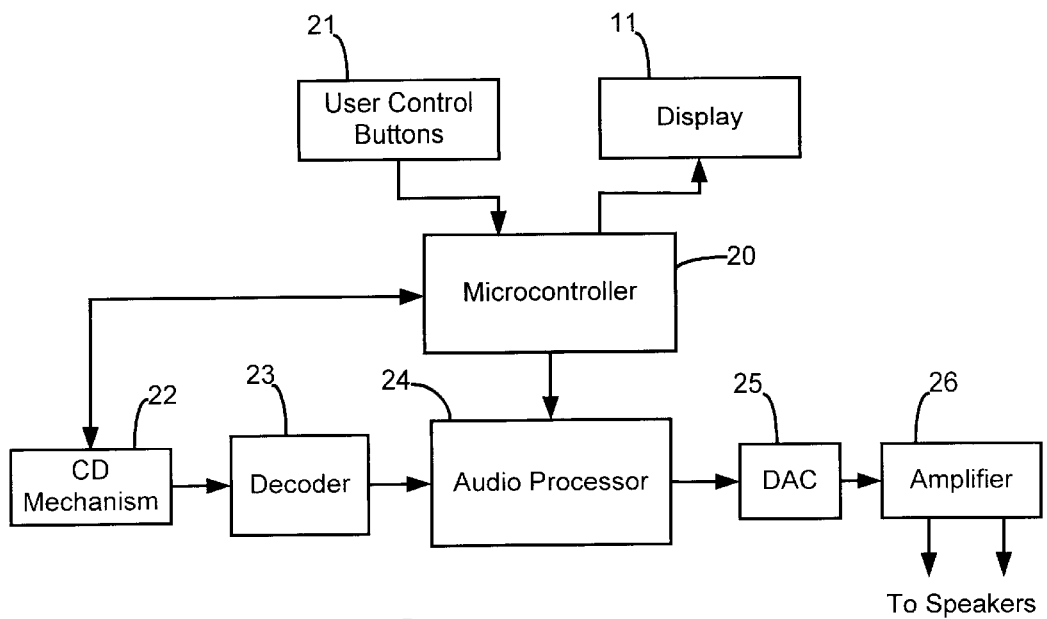
FIG. 2 is a block diagram showing main components of the media player of FIG. 1.

FIG. 2 shows some of the functional components of media player 10. A microcontroller 20 coordinates the media player operation. Microcontroller 20 implements a human-machine interface together with display 11 and user control buttons 21 (including switches 13–16). A CD mechanism 22 includes disc transport, laser pick-up, data detection and formatting, error checking, and other functions. Digital data from compressed audio files are provided to a decoder 23 which decompresses the audio information and provides it to an audio processor 24. Other audio sources may also be included to provide additional audio signals to audio processor 24, such as AM and FM tuners and a CD-Audio output from CD mechanism 22 which bypasses decoder 23. Audio processor 24 performs communized audio functions such as tone control and volume control, and may be comprised of a digital signal processor (DSP), for example. Processed digital audio signals are converted to analog signals in a digital-to-analog converter (DAC) 25. The analog audio signals are amplified in a power amplifier 26 and coupled to speakers (not shown) for audible reproduction.

Figure 3:
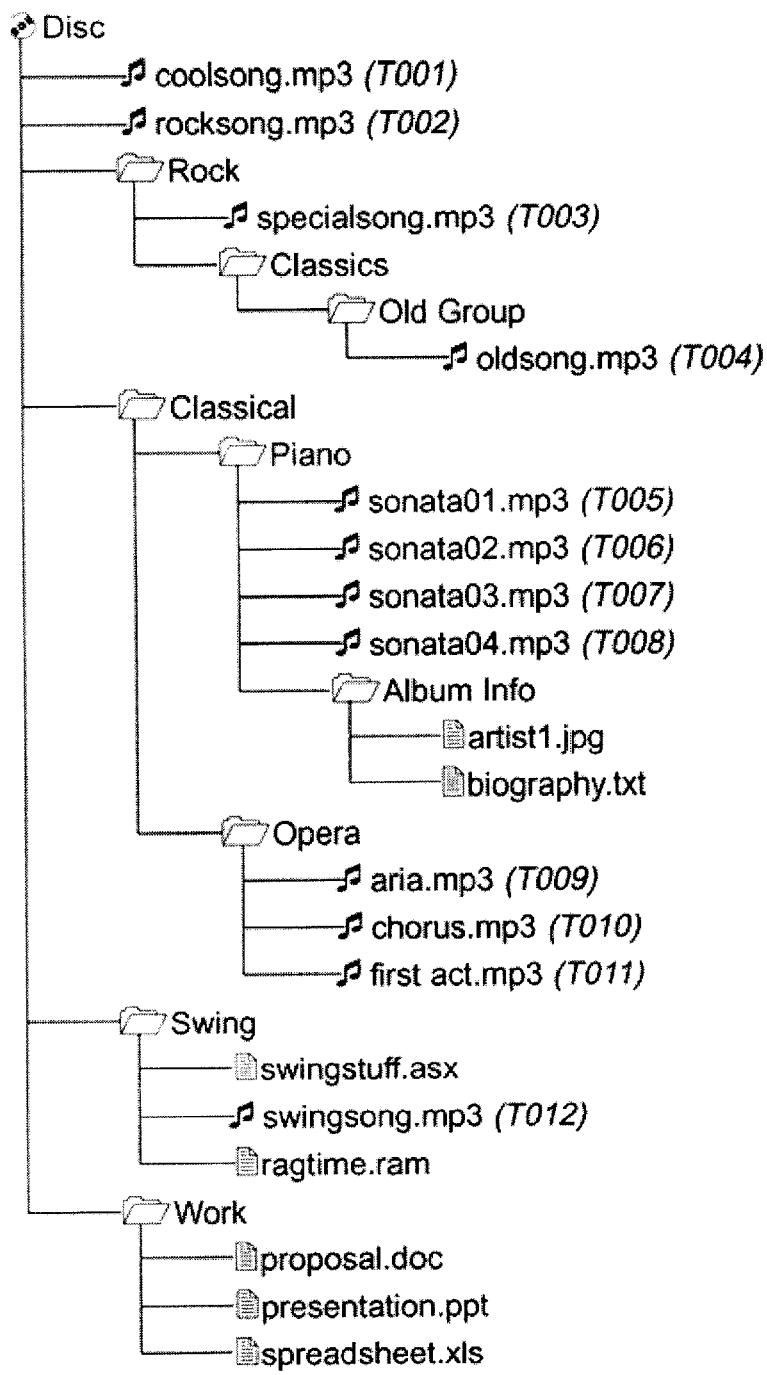
FIG. 3 shows an example of the contents of a compact disc and the selection number assignments in a flat-file mode of the media player.
Figure 4:
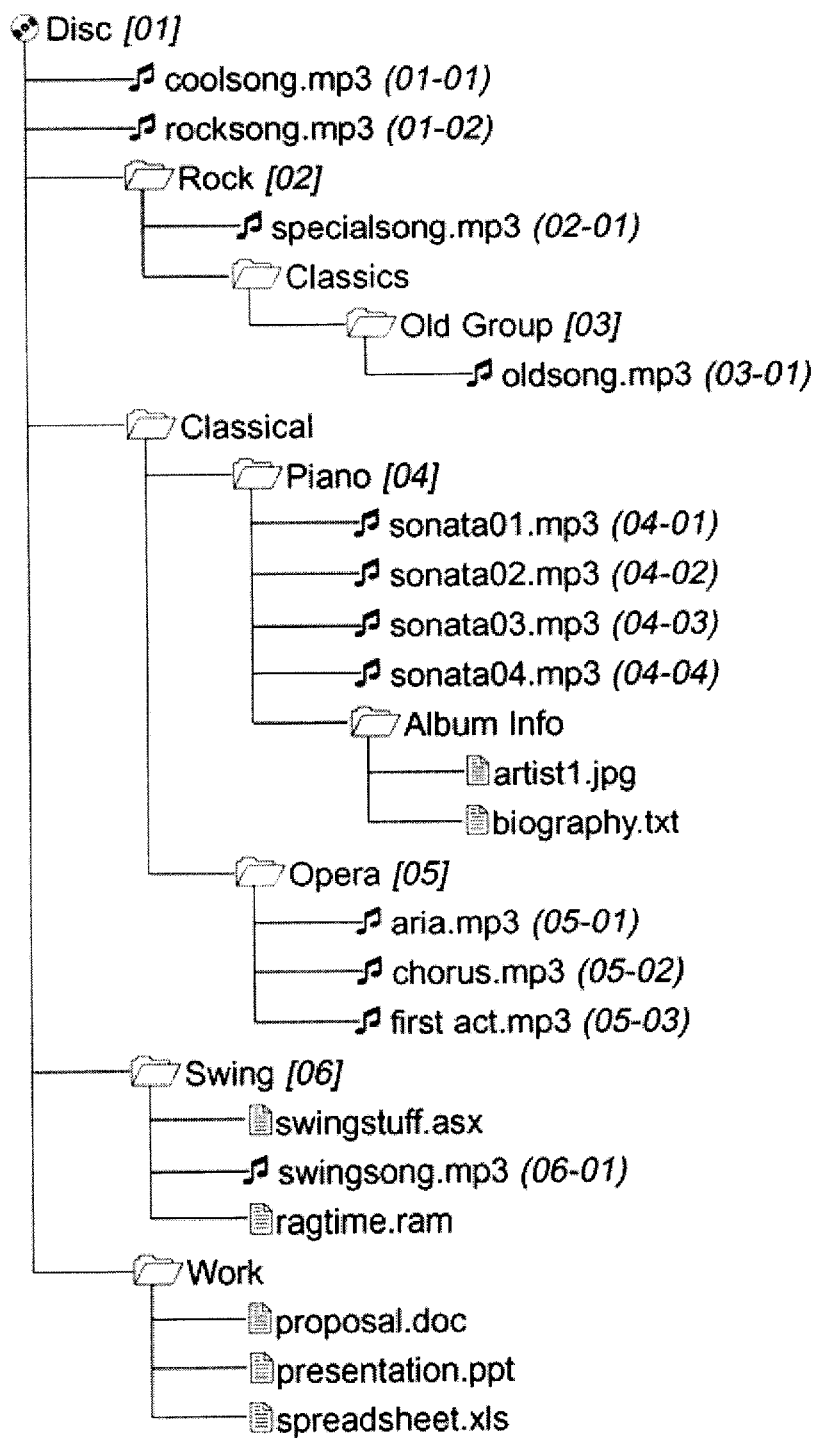
FIG. 4 shows the selection number assignments of the compact disc of FIG. 3 in a directory mode of the media player.

The present invention provides direct access to selections (e.g., songs) within a playlist. The playlist may comprise any ordered (e.g., numbered) listing of files. FIGS. 3 and 4 show how an arbitrary collection of files on a storage media (e.g., a CD-ROM) with any directory or folder structure may be scanned by a media player and assembled into a playlist automatically. In addition, user defined playlists could also be used if supported by the player.

Each user created disc may contain playable target files for reproduction (e.g., MP3 files) within various directory structures and mixed with other non-playable types of files. FIGS. 3 and 4 show the contents of the same example disc organized by the player into a flat-file playlist structure and a single-level directory playlist structure, respectively. The example disc has two selections in its root directory: coolsong.mp3 and rocksong.mp3. There are four first level folders designated Rock, Classical, Swing, and Work. The folders contain target MP3 files and various subfolders, some of which contain other target MP3 files or additional subfolders.

Due to display and control limitations of the media player shown in FIG. 1, two alternative playlists are preferably created in the preferred embodiment. As shown in FIG. 3, a flat-file mode assigns a number to each target file sequentially in a single list spanning the entire disc. In the display, each sequential file number is preceded by the letter "T" to indicate absolute track number. Thus, the MP3 files in FIG. 3 are associated with selection numbers T001 through T012.

As shown in FIG. 4, a directory mode assigns a number to each folder or subfolder (including the root directory) that contains a target file. Thus, the original folder structure is collapsed into a single-level structure of directories. Then within each directory, the target files are numbered sequentially, starting at one. The selection identifying data to be shown on the display includes the directory number followed by the selection number (e.g., 01—01). For purposes of fast seeking to selections within a particular directory, the playlist for the fast seeking operation preferably only includes the selections in the current directory.

The fast seek operation is briefly summarized as follows. Upon performing a seek-up operation, the displayed song will begin indexing by single values (e.g., 2,3,4,5,6, . . . ) until a multiple of 10 is reached. Then the displayed song number will begin being indexed by a jump value of ten (e.g., 10, 20, 30, 40, etc.). If the number of the current displayed song modulo 10 is greater than 6 (e.g., 37), then the displayed song will be indexed as follows: 37, 38, 39, 40, 41, 42, 43, 44, 45, 46, 47, 48, 49, 50, 60, 70, 80, . . . etc. If the number of the current displayed song modulo 10 is less than or equal to 6 (e.g., 33), then the displayed song will be indexed as follows: 33, 34, 35, 36, 37, 38, 39, 40, 50, 60, 70, . . . etc. Upon the nearing of the end of the playlist, the song index value will return to one. The number of songs displayed at the single step index depends on the modulo 10 of the total number of songs in the playlist. For example, if the total number of songs in the playlist is 86, the modulo 10 value is 6 and after reaching 80 the single step index is used to display songs 81–86. When the total number of songs in the playlist is exceeded, the fast seek operation wraps back around to the beginning of the playlist, performs a single index for the first ten songs, and then resumes indexing by ten. Continuing the previous example, the fast seek counts . . . 40, 50, 60, 70, 80, 81, 82, 83, 84, 85, 86, 1, 2, 3, 4, 5, 6, 7, 8, 9, 10, 20, 30,

For performing a seek-down operation, the displayed song is indexed by decrementing the selection number (e.g., 77, 76, 75, 74, 73, 72, . . . ) until the interim displayed selection number is a multiple of ten (i.e., modulo 10 is equal to zero), when it begins decrementing by a value of ten. If the currently played and displayed song number modulo 10 is greater than 4 (e.g., 57), then the displayed song will be indexed as follows: 57, 56, 55, 54, 53, 52, 51, 50, 40, 30, 20, . . . etc. If the current displayed song number modulo 10 is less than or equal to 4 (e.g., 72), then the displayed song will be indexed as follows: 72, 71, 70, 69, 68, 67, 66, 65, 64, 63, 62, 61, 60, 50, 40, 30, 20, . . . etc. As the beginning of the playlist (e.g., selection number 10) is reached, the song indexing value switches back to one (e.g., 30, 20, 10, 9, 8, 7, 6, 5, 4, 3, 2, 1). When the displayed selection number is the first song in the playlist, the next displayed selection number is the last song in the playlist. The fast seek operation continues indexing in a single song decrement from the last song until the next multiple of ten is reached. Then indexing proceeds with jumps of ten. For example, assuming 87 songs on the disk and beginning a fast seek operation while at selection number 55 in the playlist, indexing proceeds as follows: 55, 54, 53, 52, 51, 50, 40, 30, 20, 10, 9, 8, 7, 6, 5, 4, 3, 2, 1, 87, 86, 85, 84, 83, 82, 81, 80, 70, 60, 50, 40, . . . etc.

Figure 5:
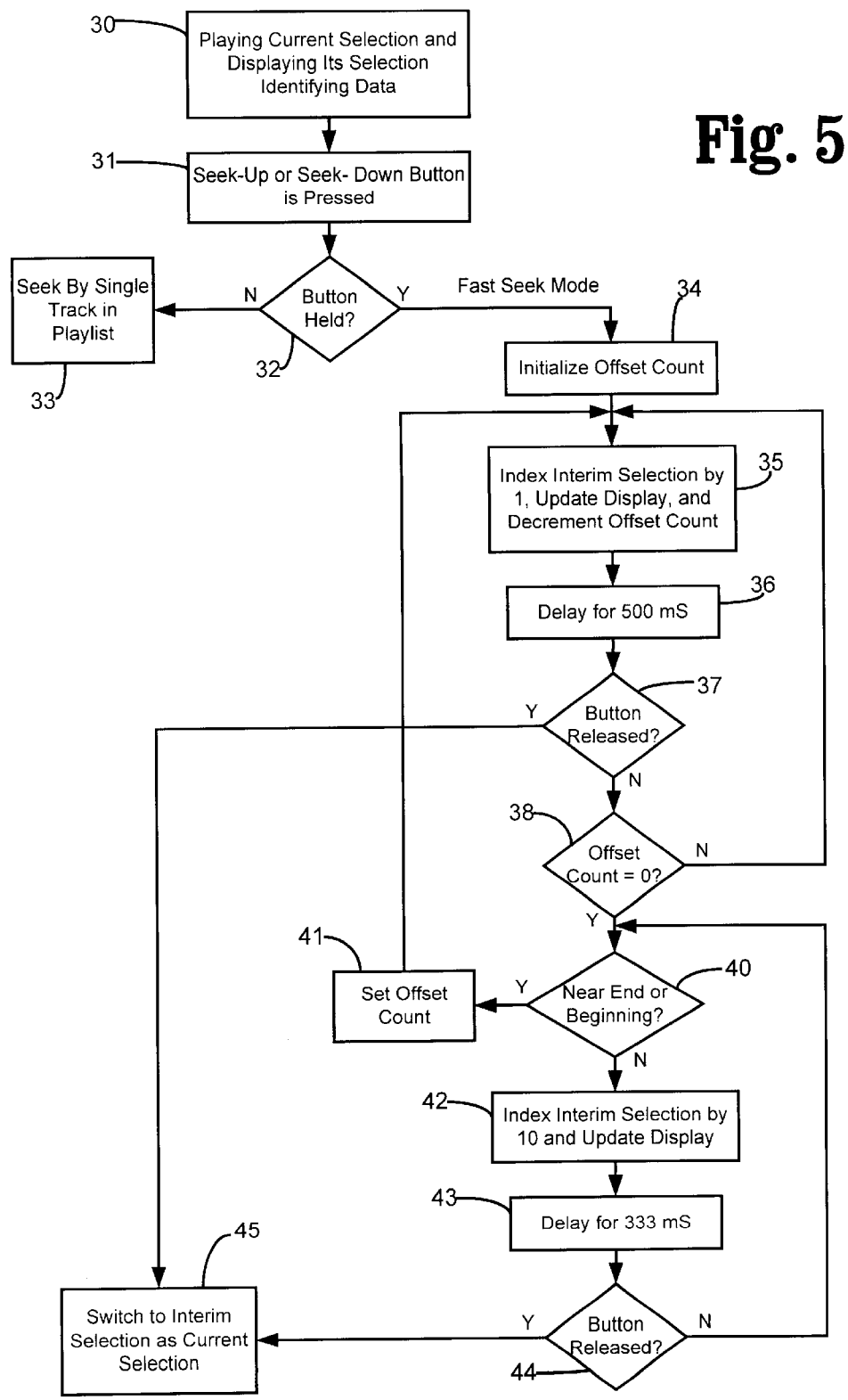
FIG. 5 is a flowchart of an overall method of the present invention.

Fast seek operation of the present invention is shown in greater detail in FIG. 5. At step 30, the media player is playing a current selection and the selection identifying data (e.g., T055) is being displayed. In step 31, the user presses either the seek-up button or the seek-down button to initiate a fast seek. In step 32, a check is made to determine whether the user is holding down the seek button for greater that a predetermined time. If not, then a single track seek is detected and the player switches to the next higher or lower track in step 33 according to which seek button was pressed.

If the button is being held, then a fast seek mode is entered. While selection numbers are being scanned on the display, the current selection continues to play. In step 34, an Offset Count is initialized. The Offset Count determines the number of single step indexes that are needed to reach an appropriate multiple of ten. In step 35, an interim selection number is indexed by 1 (e.g., is incremented by 1 in a seek-up mode or is decremented by 1 in a seek-down mode). Also in step 35, the display is updated to show the new interim selection number and the Offset Count is decremented.

Step 36 comprises a delay of about 500 milliseconds during which the interim selection number continues to be displayed. This gives the user enough time to react (e.g., to release the seek button) when a desired selection number is reached. In step 37, a check is made to determine whether the seek button has been released. Although steps 36 and 37 are shown sequentially, the release of the seek button is detected at any time during the delay. If the button is not released then a check is made in step 38 to determine whether the Offset Count has reached zero. If not, then a return is made to step 35 for further indexing by a step of one. If Offset Count has reached zero, then a check is made in step 40 whether the interim selection number is near the end of the playlist (in a seek-up mode) or the beginning of the playlist (in a seek-down mode). If the end or beginning is near, then Offset Count is set to the appropriate value in step 41 and a return is made to step 35 for single step indexing.

When not near the beginning or end of the playlist, the interim selection number is indexed by a jump of 10 and the display is updated in step 42. A delay of about 333 milliseconds is performed in step 43 and a check is made for release of the seek button in step 44. A shorter delay is performed in step 43 than in step 36 in order to accelerate the scrolling through larger playlists. If the seek button was still not released at the end of the delay, then a return is made to step 40.

When either step 37 or step 44 determine that the seek button has been released, then the media player to switches to the interim selection as the current selection in step 45. The indicated file is retrieved from the media and its audio is reproduced.

Figure 6:
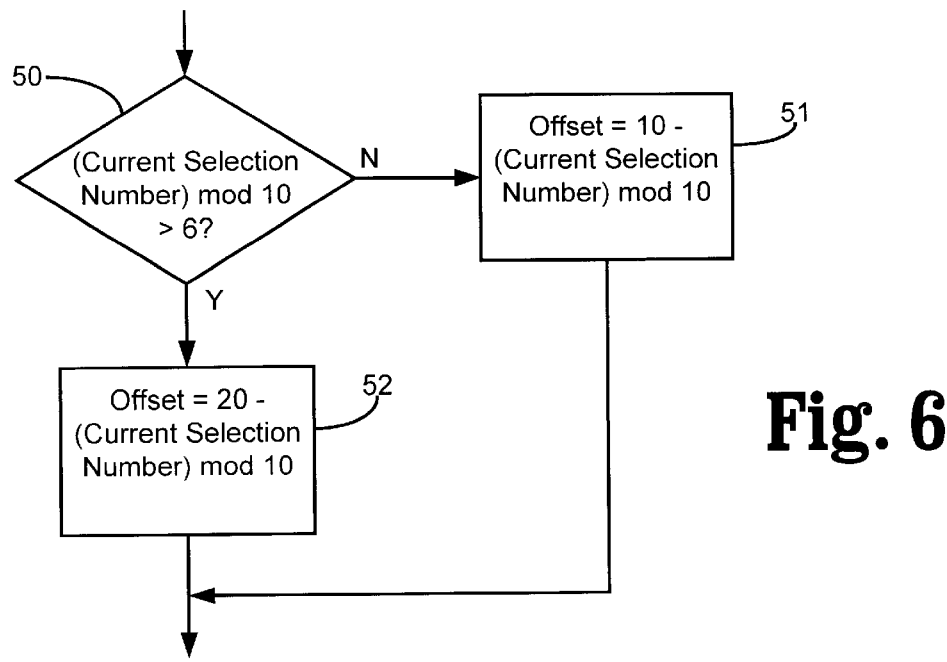
FIG. 6 is a flowchart of an initialization of the offset count of FIG. 5 while in a seek-up mode.

Initializing of the Offset Count for a seek-up operation is shown in FIG. 6. A check is made in step 50 to determine whether the current selection number mod 10 is greater than 6. If not, then Offset Count is set to 10 minus the current selection number mod 10 in step 51. Otherwise, Offset Count is set to 20 minus the current selection number mod 10 in step 52. Thus, if the number of selections from the current selection number plus one through the next multiple of 10 is not at least 4, then a single step index is used even beyond the first multiple of 10 to be reached. This ensures that at least a predetermined minimum number of single step indexes are taken before using the jump step index of 10. The predetermined minimum is preferably 4, but can be varied by changing the value of 6 in step 50.

Figure 7:
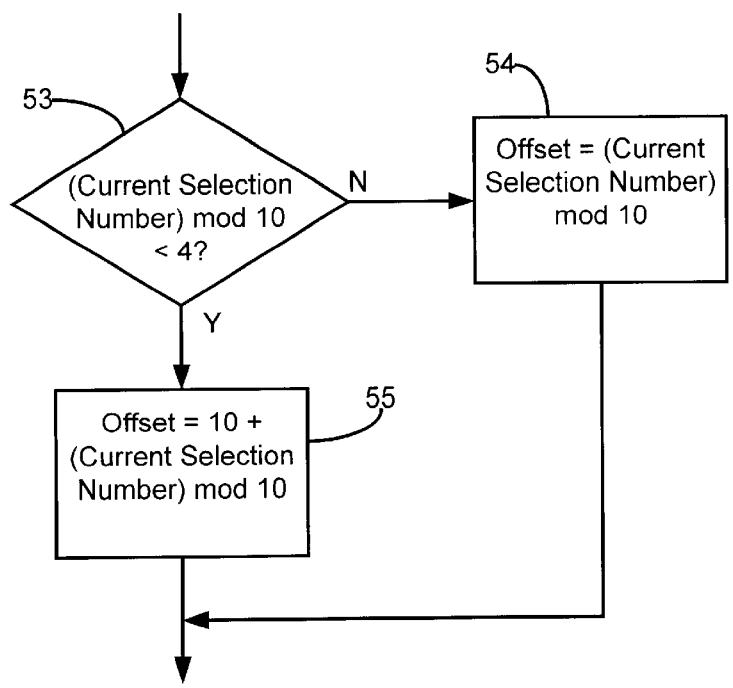
FIG. 7 is a flowchart of an initialization of the offset count of FIG. 5 while in a seek-down mode.

Initializing of the Offset Count for a seek-down operation is shown in FIG. 7. A check is made in step 53 to determine whether the current selection number mod 10 is less than 4. If not, then Offset Count is set to the current selection number mod 10 in step 54. Otherwise, Offset Count is set to 10 plus the current selection number mod 10 in step 55.

The sensing of the approach to the end of a playlist during a seek-up operation and the resetting of the Offset Count is shown in FIG. 8. In step 60, a difference Diff is determined as the difference between to the selection number of the last selection (i.e., total selections in the playlist) and the interim selection number. A check is made in step 61 to determine whether Diff is greater than 10. If Diff is greater than 10, then the method continues to step 42 for indexing by 10's. If Diff is not greater than 10, then the Offset Count is reset so that between 1 and 10 selections at the end of the playlist are displayed singly and then the first 10 selections at the beginning of the playlist are displayed singly. Thus, in step 62, a check is made to determine whether the last selection number mod 10 equals zero. If it does, then the Offset Count is set to 20 in step 63. Otherwise, the Offset Count is set to 10 plus the last selection number mod 10. Then the method returns to step 35 (FIG. 5) for indexing by single steps.

During a seek-down operation, proximity to the beginning of the playlist is detected when the interim selection number is 10. The Offset Count can be determined using the same steps as shown in FIG. 8.

What is claimed is:

1. A method of fast seeking from a current selection to a desired selection within an ordered playlist of selections for reproduction by a media player, each selection in said ordered playlist having a corresponding selection number between a first selection number and a last selection number, said method comprising the steps of:

displaying selection identifying data of said current selection on a display;

performing a control action indicating either a seek-up or a seek-down command;

performing a control action to establish a fast seek interval;

displaying selection identifying data for interim selections on said display according to a predetermined sequence of said selection numbers wherein said interim selection is indexed to successive selections in said sequence in an increasing order in response to said seek-up command and is indexed to successive selections in said sequence in a decreasing order in response to said seek-down command, and wherein said sequence indexes said interim selection number in single steps until said interim selection number has a predetermined modulo value and then indexes said interim selection number by a jump step, each selection identifying data for each interim selection in said sequence being displayed for a predetermined display time;

performing a control action to terminate said fast seek interval, wherein an interim selection having selection identifying data being displayed at the termination of said fast seek interval is a chosen selection; and reproducing said chosen selection.

2. The method of claim 1 wherein said media player includes a seek-up push button and a seek-down push button, and wherein said control action indicating either a seek-up or a seek-down command is comprised of prressing said seek-up push button or said seek-down push button, respectively.

3. The method of claim 2 wherein said control action to establish said fast seek interval is comprised of continuing to press said seek-up push button or said seek-down push button throughout said fast seek interval.

4. The method of claim 3 wherein said control action to terminate said fast seek interval is comprised of releasing said seek-up push button or said seek-down push button.

5. The method of claim 1 wherein said predetermined modulo value is comprised of zero with a modulus of ten.

6. The method of claim 1 wherein said jump step indexes said selection number by ten.

7. The method of claim 1 wherein said sequence includes at least a predetermined minimum number of single steps before using said jump step.

8. The method of claim 7 wherein said predetermined modulo value is comprised of zero with a modulus of ten, wherein said jump step indexes said selection number by ten, and wherein said predetermined minimum number is equal to four.

9. The method of claim 1 wherein, after incrementing said interim selection number by said jump step, said sequence reverts to said single step when said interim selection number is within a predetermined range of said first selection number or said last selection number and then wraps between said first selection number and said last selection number.

10. The method of claim 9 wherein, after wrapping between said first selection number and said last selection number, said sequence indexes said interim selection number in said single steps until said interim selection number reaches said predetermined modulo value and then resumes indexing with said jump step.

11. The method of claim 1 wherein said media player reproduces said selections from a predetermined media, wherein said media has a plurality of directories, and wherein said playlist is comprised of selections within one of said directories.

12. The method of claim 1 wherein said current selection continues to be reproduced during said fast seek interval.

13. The method of claim 1 wherein said predetermined display time has a first duration while said sequence is indexing at said single steps and has a second duration while said sequence is indexing at said jump steps, said second duration being shorter than said first duration.

14. The method of claim 13 wherein said first duration is equal to about 500 milliseconds and said second duration is equal to about 333 milliseconds.

15. The method of claim 1 wherein indexing by said jump step is disabled and said interim selection number is indexed only in single steps of a total number of selections in said playlist is less than a predetermined number.

16. A media player for reproducing selections from a media containing an ordered playlist of selections, each selection in said ordered playlist having a corresponding selection number between a first selection number and a last selection number, said media player performing a fast seek from a current selection to a desired selection within said playlist, said media player comprising:

a display showing selection identifying data;

a user control interface for indicating either a seek-up or a seek-down command, for establishing a fast seek interval, and for terminating said fast seek interval; and a controller responsive to said user control interface for controlling said fast seek to display selection identifying data for interim selections on said display according to a predetermined sequence of said selection numbers wherein said interim selection is indexed to successive selections in said sequence in an increasing order in response to said seek-up command and is indexed to successive selections in said sequence in a decreasing order in response to said seek-down command, wherein said sequence indexes said interim selection number in single steps until said interim selection number has a predetermined modulo value and then indexes said interim selection number by a jump step, and wherein each selection identifying data for each interim selection in said sequence is displayed for a predetermined display time, said controller switching to reproduction of a chosen selection comprised of the interim selection with its selection identifying data being displayed when said fast seek interval is terminated.

17. The media player of claim 16 wherein said user control interface is comprised of a seek-up push button and a seek-down push button.

18. The media player of claim 17 wherein said fast seek interval is established by pressing and holding said seek-up push button or said seek-down push button throughout said fast seek interval and releasing said seek-up button or said seek-down button to terminate said fast seek interval.

19. The media player of claim 16 wherein said predetermined modulo value is comprised of zero with a modulus of ten and wherein said jump step indexes said selection number by ten.

20. The media player of claim 16 wherein said sequence includes at least a predetermined minimum number of single steps before using said jump step.

21. The media player of claim 16 wherein, after incrementing said interim selection number by said jump step, said sequence reverts to said single step when said interim selection number is within a predetermined range of said first selection number or said last selection number and then wraps between said first selection number and said last selection number.

22. The media player of claim 21 wherein, after wrapping between said first selection number and said last selection number, said sequence indexes said interim selection number in said single steps until said interim selection number reaches said predetermined modulo value and then resumes indexing with said jump step.

23. The media player of claim 16 wherein said media has a plurality of directories and wherein said playlist is comprised of selections within one of said directories.

24. The media player of claim 16 wherein said predetermined display time has a first duration while said sequence is indexing at said single steps and has a second duration while said sequence is indexing at said jump steps, said second duration being shorter than said first duration.

25. The media player of claim 16 wherein said selections are comprised of compressed audio files stored on said media.

26. The media player of claim 25 wherein said compressed audio files are comprised of mp3 files.

27. The media player of claim 25 wherein said media is comprised of a compact disc.

* * * * *